March 29, 1960 E. J. SCANLON ET AL 2,930,916
GENERATOR ROTOR CONSTRUCTION
Filed July 1, 1957 2 Sheets-Sheet 1
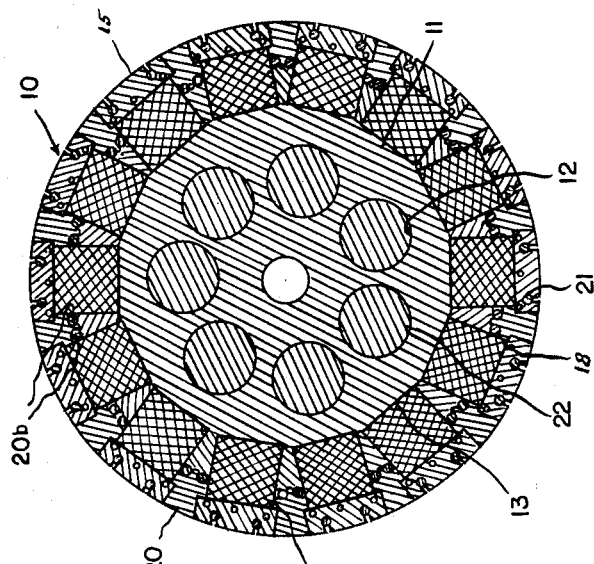
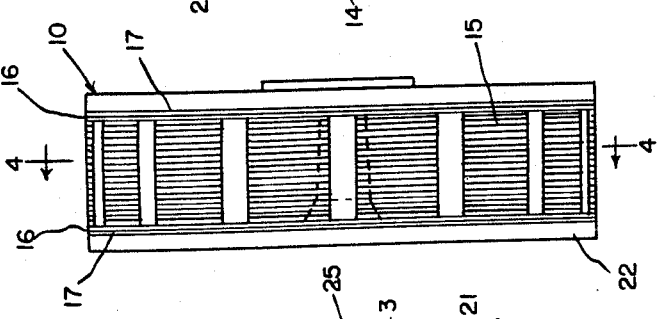
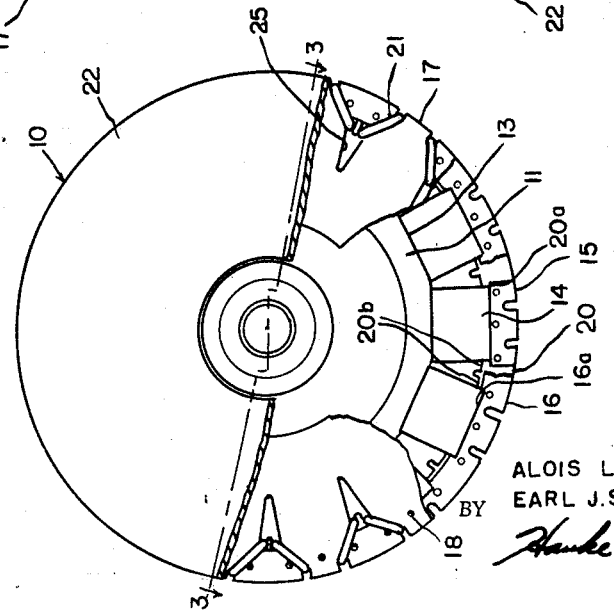
INVENTORS
ALOIS L. JOKL
EARL J. SCANLON
BY
ATTORNEYS March 29, 1960   E. J. SCANLON ET AL   2,930,916
GENERATOR ROTOR CONSTRUCTION
Filed July 1, 1957                    2 Sheets-Sheet 2
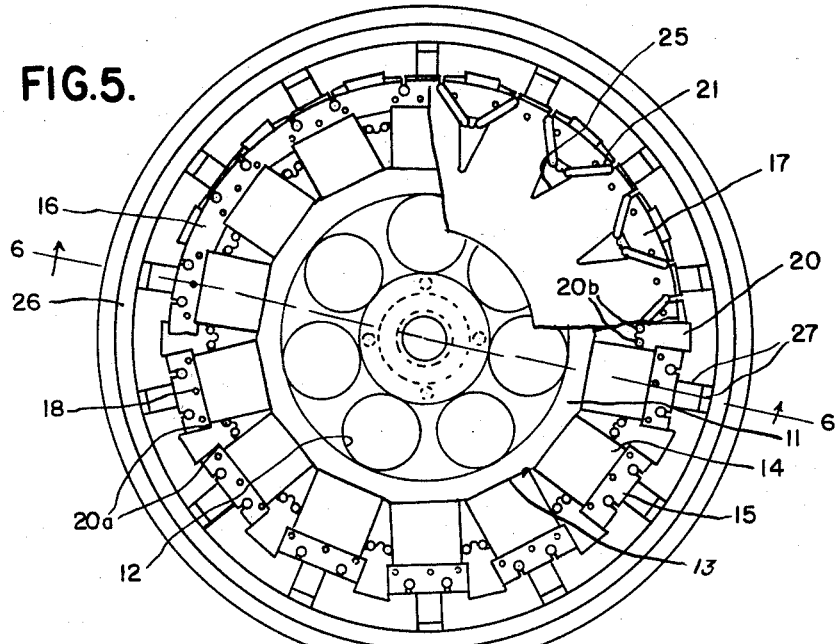
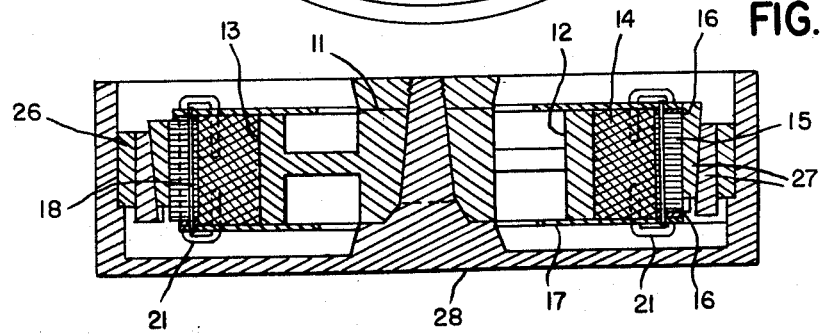
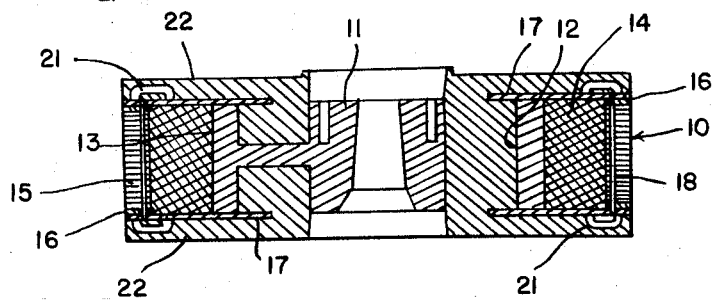
INVENTORS
ALOIS L. JOKL
BY EARL J. SCANLON
ATTORNEYS

United States Patent Office 2,930,916
Patented Mar. 29, 1960

2,930,916

GENERATOR ROTOR CONSTRUCTION

Earl J. Scanlon, Detroit, and Alois L. Jokl, Garden City, Mich., assignors to Continental Motors Corporation, Detroit and Muskegon, Mich., a corporation of Virginia Application July 1, 1957, Serial No. 669,277

2 Claims. (Cl. 310—156)

Our invention relates to electric generators, and more particularly to an improved generator permanent magnet rotor construction and to the method of assembly.

Several problems arise in constructing and assembling permanent magnet rotors, particularly rotors such as are used in higher speed generators. Primarily the problems arise in retaining the magnets and pole shoes in position, as assembled, to withstand the high centrifugal forces of rotation, which amount to several hundred pounds tending to pull the poles and magnets away from the center core at operating speeds. The material of permanent magnets is brittle, hard and structurally weak, so that the normal methods of securing parts in assembly are prone to crack or otherwise damage the magnets. In addition, the magnetic properties of the rotor are such that normal attaching means are electrically and magnetically undesirable. Yet, without secure anchorage, the magnets and pole pieces tend to pull away from the core if only casting material is relied upon, resulting in changes of magnetic properties and consequent reduction of generator output, besides increasing the possibility that the rotor may strike the stator.

An object of the present invention is to improve generator rotor construction by providing a more effective method of assembling rotor parts.

Another object of the invention is to avoid changes of generator output caused by centrifugal forces altering the positions of the magnets and pole shoes by providing an improved rotor assembly.

A further object of the invention is to facilitate permanent attachment of permanent magnets and pole shoes to the core of a generator rotor by holding the magnets and pole shoes by means of self supporting end rings.

A still further object of the invention is to provide an improved generator rotor construction by firmly clamping permanent magnets and pole shoes to a central core and then casting a non-ferrous casing about the parts.

For a more complete understanding of the invention, reference may be had to the accompanying drawings illustrating a preferred embodiment of the invention in which like reference characters refer to like parts throughout the several views and in which:

Fig. 1 is an end elevational view of a rotor constructed in accordance with the invention and having parts cut away to illustrate the structure thereof.

Fig. 2 is a side elevational view of the rotor of Fig. 1.

Fig. 3 is a cross-sectional view taken substantially on the line 3—3 of Fig. 1.

Fig. 4 is a cross-sectional view taken substantially on the line 4—4 of Fig. 2.

Fig. 5 is an elevational view of the rotor assembled and clamped prior to casting the non-ferrous casing, and Fig. 6 is a cross-sectional view taken substantially on the line 6—6 of Fig. 5.

Referring to Figs. 1 through 4, the completely assembled rotor 10 comprises a central spider 11 having longitudinal holes 12 and flat edge faces 13 on each of which is positioned a permanent magnet 14. A pole shoe 15 is located on the outer face of each magnet, being positioned by means of annular spacers 16 on each side, each spacer 16 having a groove 16a fitting on the end of the respective magnets 14, and the parts secured by means of retainers or end rings 17 on each side. The pole shoes 15 are preferably laminated structures as shown, being sandwiched between the spacers 16 and held by means of rivets 18, the end rings 17 as riveted to the pole pieces thus acting to secure the assembly against the stresses due to centrifugal forces of rotor operation.

Damper wedges 20 may be provided between and held in place by the pole shoes 15. Damper bars 21 may be inserted into the pole shoes 15 and formed around during assembly to contact the damper wedges 20. A casing 22 of non-ferrous material having good electrical conductivity properties is cast in and about all existing spaces of the assembly to form a shorted squirrel cage damper assembly construction. Where material and method of casting yield electrical conductivity satisfactory for purposes of damping in the location occupied by the damper wedge 20 and the bars 21, such wedges and bars may be omitted as separate items.

Referring to Figs. 5 and 6, the method of assembly will become apparent. The magnets 14 are located on the flat faces 13 of the spider 11 and the pole shoes 15 are located on the free ends of the magnets 14, being spaced by means of the grooves 16a of the spacers 16. If used, the damper wedges 20 are inserted. The end rings 17 are then set in place over the rivets 18 so as to overlap the spider 11, the magnets 14 and the spacers 16.

This assembly is next located in a ring fixture 26, and clamping wedges 27, if used, are pressed between each pole head 15 and the inner periphery of the ring fixture 26 to hold each hole shoe 15 and magnet 14 securely clamped to the spider 11.

The rivets 18, previously inserted through aligned holes in the end rings 17, spacers 16, and pole shoes 15, are peened over to hold these parts securely in assembly.

If used, the damper bars 21 are then inserted through aligned holes in the pole shoes 15, spacers 16, and end rings 17, then bent over at each end and down through wedge shaped cutouts 25 in the end rings 17 so as to come in close contact with the inner shoulders 20b provided on the wedges 20.

Finally, the rigidly clamped assembly is set into a mold 28 and a non-ferrous material such as aluminum is cast around the entire riveted and clamped unit, filling the spider holes 12 and all existing spaces in and around the rotor parts to form the integral casing 22.

After removing from the mold, the casing may then be machined down on the periphery to the outer faces of the pole shoes 15, to create the final structure shown in Figs. 1 through 4. This structure may be easily balanced and where necessary to remove metal, small holes may be drilled into the casing 22 preferably centrally located between the pole shoes 15.

Although we have described only one preferred embodiment of the invention, it will be apparent to one skilled in the art to which the invention pertains that various changes and modifications may be made therein without departing from the spirit of the invention or the scope of the appended claims.

We claim:

1. A generator rotor structure having assembled parts comprising a spider, a plurality of permanent magnets annularly spaced about the periphery of said spider, pole shoes contacting the outer faces of said magnets, and annular self-supporting end rings enclosing the assembled parts and secured only to said pole shoes to retain said pole shoes and said magnets against radially directed stresses due to centrifugal forces of generator operation, a non-ferrous casing cast about said parts and said end rings and filling all existing spaces between same, wedge elements interposed between and contacting adjacent pole shoes, and damper elements contacting said pole shoes and said wedge elements, said wedge elements, damper elements and casing having substantially high electrical conductivity characteristics whereby to form an electrically shorted squirrel cage damper structure enclosing said magnets and pole shoes, said wedge elements having inner and outer shoulders, each of said pole shoes having edges projecting over the outer face of said magnet and engaging the outer shoulders of the adjacent wedges to retain same against radial displacement, said damper elements anchored to said pole shoes and engaged with the inner shoulders of said wedge elements, annular spacers overlying said pole shoes and said wedge elements and encircling said magnets, and said spacers provided with means retaining said magnets against relative angular displacement, said end rings overlying said spacers, said magnets, and an outer annular portion of said spider.

2. A generator rotor structure comprising a fabricated assembly molded in a cast non-ferrous casing and comprising a spider provided with annularly spaced magnet seats disposed about the periphery thereof, a plurality of permanent magnets seated respectively on said magnet seats and annularly spaced about the periphery of said spider, pole shoes seated on the outer faces of said magnets, annular end rings enclosing the aforesaid assembly and secured to said pole shoes and thereby serving to retain said shoes in place, wedge elements disposed in wedge engagement between all said annularly spaced magnet and pole shoe assemblies and damper elements connecting said pole shoes and wedge elements, said annular rings, wedge elements and damper elements having substantially high electrical conductivity characteristics whereby to form an electrical shorted squirrel cage damper structure enclosing said magnets and pole shoes, said pole shoes having slots opening radially outwardly, said damper elements comprising wire like members seated in the slots of said pole shoes and interlocked about the inner face of said wedge elements.

References Cited in the file of this patent

UNITED STATES PATENTS

| | | |
|---|---|---|
| 2,493,102 | Brainard | Jan. 3, 1950 |
| 2,643,350 | Merrill | June 23, 1953 |
| 2,680,822 | Brainard | June 8, 1954 |
| 2,703,849 | Worth | May 8, 1955 |

FOREIGN PATENTS

| | | |
|---|---|---|
| 463,813 | Great Britain | Apr. 7, 1937 |